United States Patent [19]

Nixon et al.

[11] Patent Number: 4,539,169
[45] Date of Patent: Sep. 3, 1985

[54] APPARATUS AND METHOD FOR FORMING A CO-EXTRUSION FROM EXTRUDED STRIPS

[75] Inventors: Bryan E. Nixon, Akron; Donald W. Ward, Silver Lake; Ronald J. Zaucha, Cuyahoga Falls, all of Ohio

[73] Assignee: The Goodyear Tire & Rubber Company, Akron, Ohio

[21] Appl. No.: 518,736

[22] Filed: Jul. 29, 1983

[51] Int. Cl.³ .............................................. B29D 7/10
[52] U.S. Cl. ..................................... 264/171; 118/411; 156/244.11; 156/244.27; 156/500; 264/176 R; 425/131.1; 425/192 R; 425/194; 425/467; 427/402
[58] Field of Search ............................ 264/171, 176 R; 427/402; 118/411; 425/194, 192 R, 327, 374, 376 B, 466–467, 131.1; 156/500, 244.11, 244.27

[56] References Cited

U.S. PATENT DOCUMENTS

| | | | |
|---|---|---|---|
| 1,603,813 | 10/1926 | Stein | 264/176 R |
| 2,382,177 | 8/1945 | Schanz | 425/131.1 |
| 2,560,022 | 7/1951 | Formaz | 425/190 |
| 2,897,543 | 8/1959 | Weston et al. | 425/190 |
| 2,944,285 | 7/1960 | Rhodes | 425/224 |
| 3,060,512 | 10/1962 | Martin et al. | 264/176 R |
| 3,142,091 | 7/1964 | Curtiss | 425/374 |
| 3,280,427 | 10/1966 | Smith | 425/131.1 |
| 3,439,383 | 4/1969 | Meitinger | 425/224 |
| 3,486,195 | 12/1969 | Greenwood et al. | 425/131.1 |
| 3,956,056 | 5/1976 | Boguslawski et al. | 425/224 |

FOREIGN PATENT DOCUMENTS

| | | | |
|---|---|---|---|
| 1582430 | 9/1969 | France | 264/171 |
| 55-15294 | 4/1980 | Japan | 264/171 |

Primary Examiner—Jeffery Thurlow
Attorney, Agent, or Firm—Frederick K. Lacher; T. P. Lewandowski

[57] ABSTRACT

An apparatus and method wherein strips of elastomeric material are fed separately onto a roller at more than one position around the circumference of the roller at predetermined axial locations to form predetermined cross-sectional areas of the cross section of the band. Between the positions where the strips are applied and prior to removing the band from the roller, guide means is provided to guide the strips in the predetermined axial locations. The guide means confines the strips between a circumferentially grooved guide member and the cylindrical surface and the grooved guide member may be a replaceable insert mounted in a recess of a plate for accommodating different sizes and shapes of the formed band with different inserts.

30 Claims, 13 Drawing Figures

APPARATUS AND METHOD FOR FORMING A CO-EXTRUSION FROM EXTRUDED STRIPS

This invention relates generally to the forming of a band or co-extrusion of elastomeric material containing more than one compound on a roller die. This is desirable for tire sidewalls where different compounds are used for different parts such as the chafer, white sidewall and black sidewall. Tire treads are also made of different compounds for the cap and edges. Use of a roller die decreases the working of the material and reduces the power required to form the band.

Heretofore, it has been proposed to extrude two or more compounds from multiple extruders through a common die orifice against a roller die which is braked to fill out a passageway and a groove in the roller die. One of the problems with such a method and apparatus has been establishing and maintaining split lines between the different compounds. Another problem has been the changing of the roller die or sleeve to make products of different sizes and shapes.

The present invention is directed to a method and apparatus in which strips of different compounds are extruded from multiple extruders through separate orifices onto the roller at predetermined positions over the roller surface. The shape of the strips and the formed band are controlled by guides so that the split lines between strips and the final cross-sectional shape of the band are precisely predetermined. Also, replaceable inserts may be provided to guide strips of different sizes and shapes.

In accordance with one aspect of the invention there is provided a multiple orifice roller die extrusion apparatus for combining two or more elastomeric materials into a formed band comprising a roller having a generally cylindrical surface, means for rotating the roller about an axis, die head means positioned adjacent to and spaced from the cylindrical surface, the die head means having a first orifice and a second orifice spaced circumferentially from the first orifice, first pressure means for feeding a first strip of elastomeric material through the first orifice at a first predetermined circumferential position over the cylindrical surface, second pressure means for feeding a second strip of elastomeric material through the second orifice at a second predetermined circumferential position over the cylindrical surface, at least a portion of the second orifice being in the same axial position as a portion of the first orifice and spaced radially outward from a predetermined distance from the cylindrical surface so that a portion of the second strip is in overlapping relation with the first strip upon rotation of the roller, and the die head means including guide means for sliding engagement with at least a portion of the first strip to guide the first strip to predetermined axial locations in the formed band.

In accordance with another aspect of the invention there is provided a method of combining two or more strips of elastomeric material into a formed band of predetermined cross section with the strips applied and guided to predetermined axial locations to form predetermined areas of said cross section comprising:

(a) rotating a roller having a generally cylindrical surface;

(b) feeding a first strip of elastomeric material onto the cylindrical surface at a first predetermined circumferential position over the surface and at a first predetermined axial location;

(c) guiding the first strip during movement on the roller to a second predetermined circumferential position over the roller;

(d) feeding a second strip of elastomeric material over the cylindrical surface at the second predetermined circumferential position over the surface to form the band with the second strip being positioned within the formed band at a second predetermined axial location;

(e) guiding the formed band as the band is carried by the roller to a third predetermined circumferential position spaced downstream from the second orifice; and (f) removing the formed band from the cylindrical surface of the roller.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but three of the various ways in which the principles of the invention may be employed.

Figure 1:
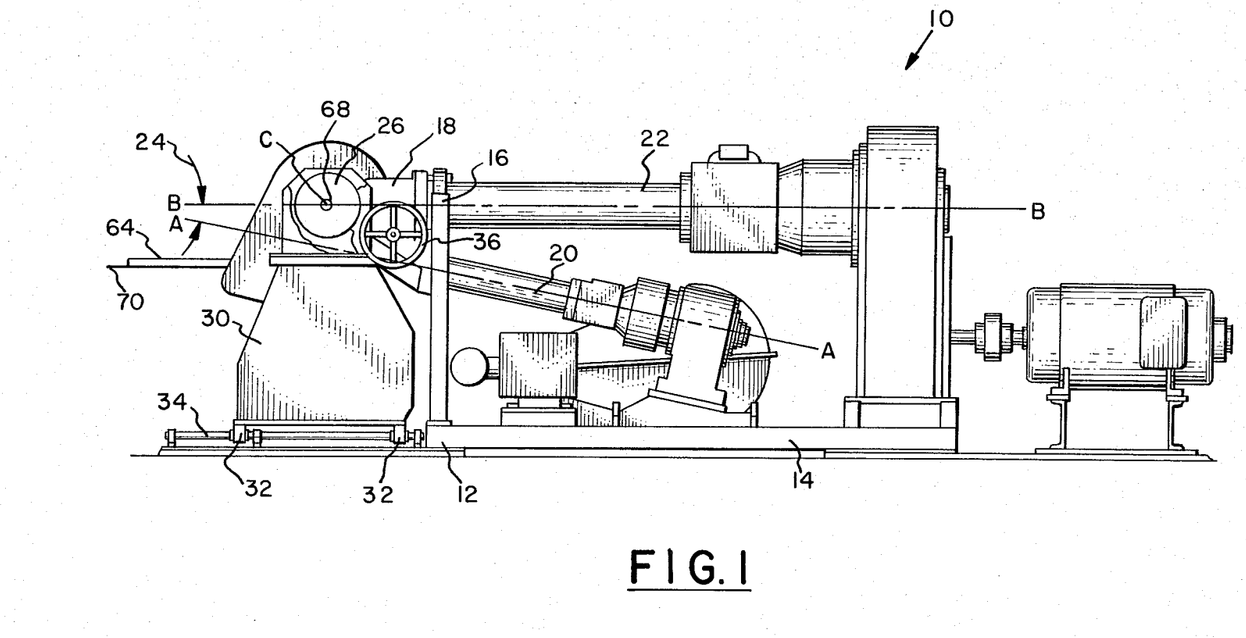
FIG. 1 is an elevation of a multiple orifice roller die extrusion apparatus embodying the invention with parts being broken away.

Referring to FIG. 1, a multiple orifice roller die extrusion apparatus 10 is shown having a frame 12 with a base 14 and a front support 16. A die head 18 is mounted on the front support 16 and is connected to a first pressure means such as first extruder 20 mounted on the base 14 and to a second pressure means such as second extruder 22 which is also mounted on the base 14 and positioned over the first extruder. The first extruder 20 is of a type having a screw rotatable about an axis A—A and the second extruder is of a similar type having a screw rotatable about an axis B—B. As shown in FIG. 1, the first extruder 20 and second extruder 22 may be positioned with the axes A—A and B—B at an acute angle 24 to facilitate the feeding of extrudate from both extruders into the die head 18.

A roller 26 having a generally cylindrical roller surface 28 is mounted for rotation about an axis C—C on a frame support 30 which is slidable toward and away from a generally cylindrical die head surface 31 of the die head 18 which conforms to the roller surface. Preferably sleeves 32 on the frame support 30 are slidably mounted on rods 34 extending along the base 14. Suitable means such as a rack and gear connected to a hand wheel 36 may be provided for moving the roller 26 into the desired proximity with the die head 18 as shown in FIG. 2.

Figure 5:
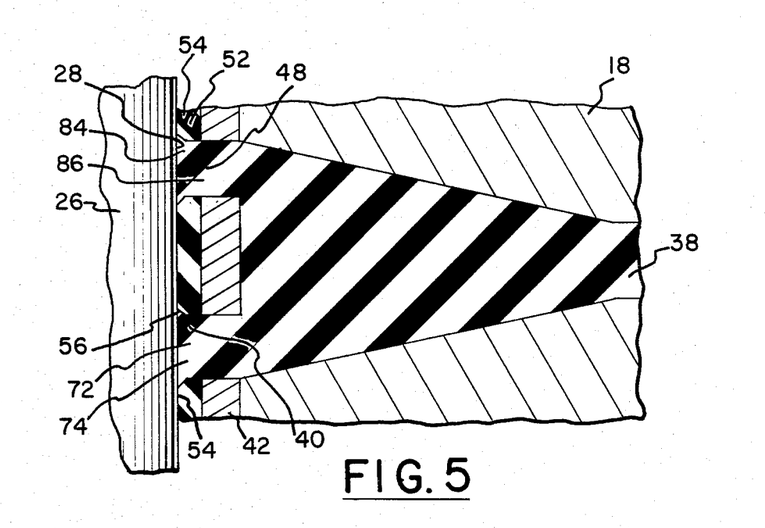
FIG. 5 is a fragmentary sectional view taken along the line 5—5 in FIG. 2 showing the passageway through the die head and the first and third orifices through which the elastomeric material is fed to provide the two side strips.
Figure 5A:
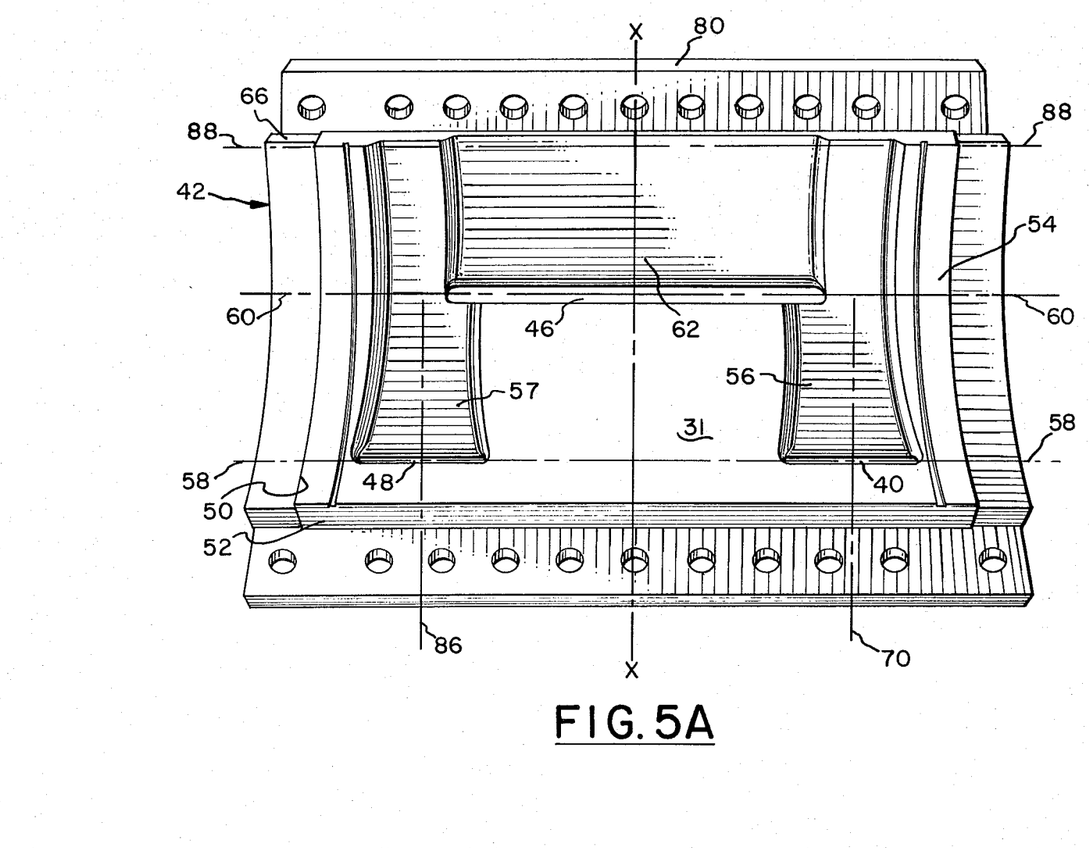
FIG. 5A is an elevation of the interface of the guide plate taken along the plane of line 5A—5A in FIG. 2 with the roller and main body of the die head removed.

A first die passageway 38 in the die head 18 extends from the first extruder 20 to a first orifice 40 in a circumferentially grooved body having guide means such as guide plate 42 at the cylindrical die head surface 31. A second die passageway 44 in the die head 18 extends between the second extruder 22 and a second orifice 46 in the guide plate 42 as shown in FIGS. 2 and 5A. The second orifice 46 is circumferentially or angularly spaced downstream from the first orifice 40. As shown in FIG. 5A, the first orifice 40 is positioned on one side of the cylindrical surface 31 of the die head 18 and a third orifice 48 is positioned axially on the opposite side of the cylindrical surface but at substantially the same position circumferentially of the roller in the guide plate 42.

Figure 3:
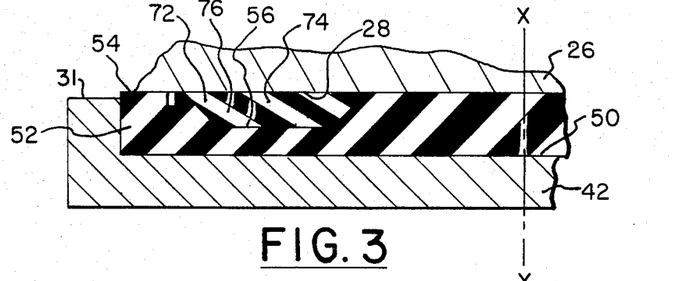
FIG. 3 is a fragmentary sectional view taken along line 3—3 in FIG. 2 showing the strip applied to the roller surface and the guide means including the replaceable insert.
Figure 4:
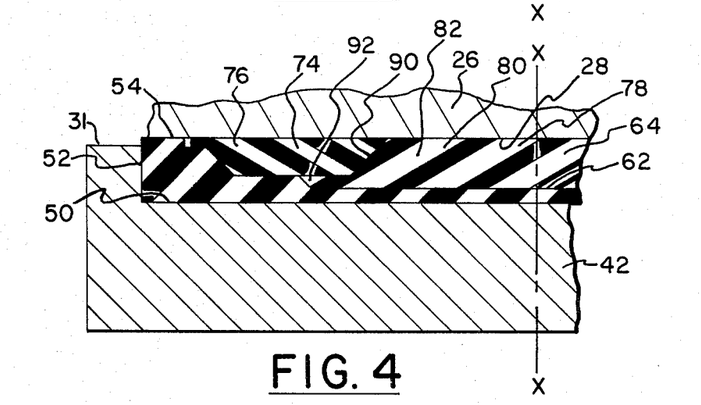
FIG. 4 is a fragmentary sectional view like FIG. 3 taken along line 4—4 in FIG. 2.

Referring to FIGS. 3, 4 and 5A, the guide plate 42 may have a circumferentially extending recess 50 for containing a guiding member such as replaceable guide insert 52 which may be of a nonmetallic moldable material that can be fastened to the guide plate by screws or other fasteners (not shown). Edges 54 of the guide insert 52 may protrude from the surface of the guide plate 42 to provide a seal to retain the extrudate in the space defined by the guide insert and the cylindrical surface 28 of the roller 26. The guide insert 52 of the guide plate 42 has a first groove 56 extending from the first orifice 40 downstream to the second orifice 46. A third groove 57 having the same size as first groove 56 is spaced the same distance from centerline X—X on the opposite side of the die head 18 and extends circumferentially from the third orifice 48 to the second orifice 46. The guide insert 52 has a configuration to maintain the shape of the extrudate fed from the first orifice 40 and the third orifice 48 to provide a first cross-sectional area of the total cross section of the band 64 from a first predetermined circumferential position 58 at the first orifice and third orifice to a second predetermined circumferential position 60 at the second orifice 46. The first groove 56 for the extrudate from the first orifice 40 and the third groove 57 for the third orifice 48 are merged with a second groove 62 having the cross section and configuration of a formed band 64 at the second predetermined circumferential position 60 as shown in FIGS. 4 and 5A. The second groove 62 extends from the second predetermined circumferential position 60 downstream to exit end 66 of the guide plate 42.

Figure 2:
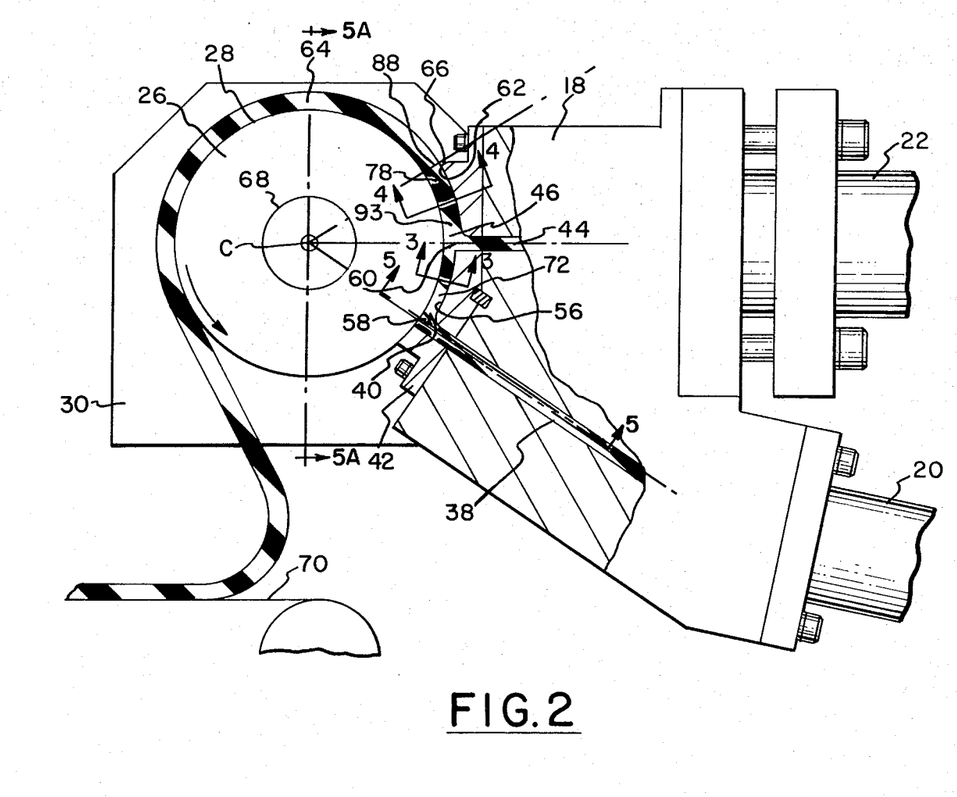
FIG. 2 is an enlarged fragmentary view like FIG. 1 showing the die head partially in section, the roller die and a portion of the take-away belt.

As shown in FIG. 2, the roller 26 is mounted on a shaft 68 which may be driven in a counterclockwise direction as shown by the arrow. Suitable power means such as an electric motor and speed control means well known to those skilled in the art may be provided.

Below the roller 26 a take-away belt 70 may be positioned for moving the formed band 64 away from the apparatus 10.

In operation different compounds of elastomeric material suitable for tire treads may be fed into the extrusion apparatus 10. A compound suitable for the tread edges may be fed into the first extruder 20 and a compound suitable for the tread cap may be fed into the second extruder 22. The roller 26 is rotated as are the screws in the extruders 20 and 22. The extrudate from the first extruder 20 passes through the first die passageway 38 and through the first orifice 40 to form a first strip 72 at the first predetermined circumferential position 58 over the cylindrical roller surface 28 and at a first predetermined axial location 74 to form a first cross-sectional area 76 of the cross section of the formed band 64. The first strip 72 is guided in the first groove 56 of the guide insert 52 as it is moved on the cylindrical roller surface 28 to the second predetermined circumferential position 60 so that the first strip is maintained in the first predetermined axial location 74 during that time.

The extrudate from the extruder 22 is fed through the second die passageway 44 and into the second orifice 46 over the cylindrical roller surface 28 at the second predetermined circumferential position 60 to provide a second strip 78 which is positioned within the formed band 64 at a second predetermined axial location 80 to form a second cross-sectional area 82 of the cross section of the formed band.

Third strip 84 is formed by the third orifice 48 from the first extruder 20 at the first predetermined circumferential position 58 and on the opposite side of the cylindrical roller surface 28 from the first strip 72 at a third predetermined axial location 86 to form a third cross-sectional area (not shown) of the formed band 64. The third strip 84 is guided and maintained in the third predetermined axial location 86 by the third groove 57 similar to the first groove 56 in the guide insert 52 between the first predetermined circumferential position 58 and the second predetermined circumferential position 60.

Between the second predetermined circumferential position 60 and the end 66 of the guide plate 42 is the second groove 62 which guides the formed band 64 to maintain the first strip 72, second strip 78 and third strip 84 in the first predetermined axial location 74, second predetermined axial location 80 and third predetermined axial location 86 as the band is carried by the roller 26 to a third predetermined circumferential position 88 at the exit end 66 of the guide plate. In this way, the split lines 90 are maintained between the strips 72, 78 and 84.

As shown in FIGS. 3, 4 and 5A, the second orifice 46 may be positioned so that at least a portion of the second orifice is in the same axial position as portions of the first orifice 40 to provide an overlapping edge 92 of the second strip 78. The second orifice 46 may also be spaced radially outward from the cylindrical die head surface 31 a distance 93 which is greater than the distance the first orifice 40 and third orifice 48 are recessed in the cylindrical surface to facilitate the overlapping of the first and third strips 72 and 84 by the second strip 78.

With this construction, the roller 26 can be moved away from the die head 18 for cleaning the apparatus 10. Also a different guide insert 51 with different size grooves 56, 57 and 62 may be fastened in the recess 50 of the guide plate 42 so as to produce formed bands such as treads of different sizes.

Figure 6:
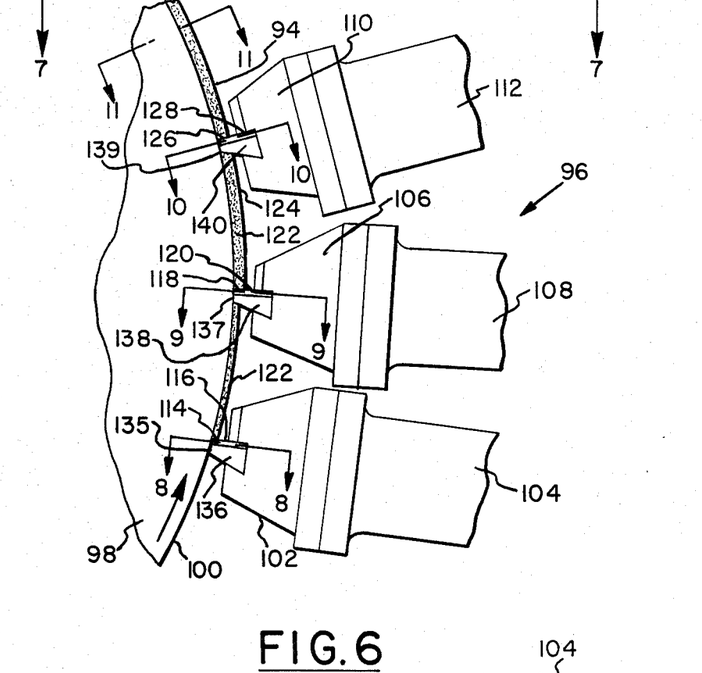
FIG. 6 is a fragmentary end view of a modification showing the roller and three separate extruders feeding the strips of elastomeric material to the roller surface through three separate die heads at three circumferentially spaced positions around the roller surface.
Figure 7:
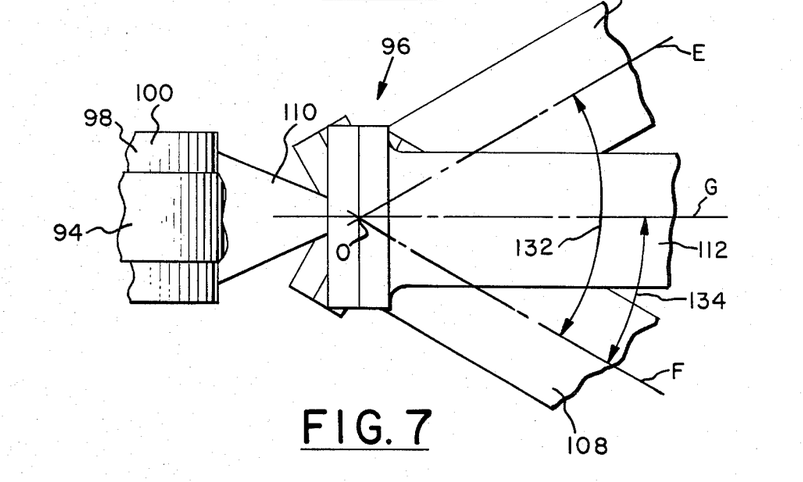
FIG. 7 is a schematic fragmentary plan view taken along the line 7—7 in FIG. 6 showing the angular positions of the extruders.
Figure 11:
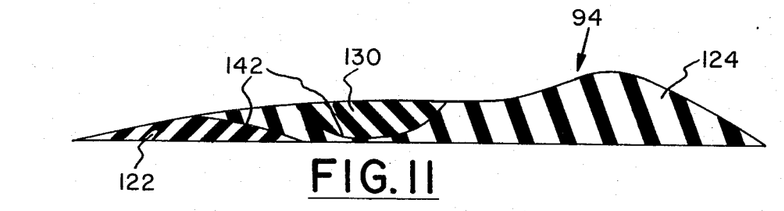
FIG. 11 is a diagrammatic sectional view taken along line 11—11 in FIG. 6 showing the formed band in cross section on the roller surface.

Referring to FIGS. 6 through 11, a modification is shown in which a formed co-extrusion such as a sidewall 94 having the general cross section shown in FIG. 11 is formed on a multiple orifice roller die extrusion apparatus 96, shown schematically in FIGS. 6 and 7. A roller 98 having a generally cylindrical surface 100 is mounted for rotation about an axis D—D in a counterclockwise direction indicated by the arrow in FIG. 6. The die head means includes a first die head 102 connected to a first pressure means such as first extruder 104, second die head 106 connected to second pressure means such as second extruder 108 and third die head 110 connected to third pressure means such as third extruder 112.

The first die head 102 includes a first orifice 114 in a first orifice plate 116 located at a position spaced from the second die head 106. The second die head 106 has a second orifice 118 in a second orifice plate 120 which may be located at a predetermined position spaced upstream from the third die head 110. The second orifice 118 is spaced radially from the roller cylindrical surface 100 a distance at least equal to the distance the first orifice 114 is spaced from the cylindrical roller surface where there is overlapping of a first strip 122 fed from the first orifice by a second strip 124 fed from the second orifice. The third die head 110 has a third orifice 126 in a third orifice plate 128 extending downstream from the second die head 106 a predetermined distance. A third strip 130 may be fed from the third orifice 126 and the sidewall 94 maintained in the form shown in FIG. 11 as it continues downstream from the third die head 110. At some position along the roller 98 downstream of the third die head 110, the sidewall 94 may be removed from the roller. In this particular embodiment the first strip 122 may be of a compound which is desirable for a chafer. The second strip 124 may be of a compound which is desirable for the black sidewall and the third strip 130 may be of a compound which is desirable for the white sidewall of the sidewall 94.

As shown in FIG. 7, the axes O—E, O—F and O—G around which the screws of first extruder 104, second extruder 108 and third extruder 112 rotate may be positioned at angle 132 between axes O—E and O—F and angle 134 between axes O—F and O—G to provide the necessary space for the extruders.

Figure 8:
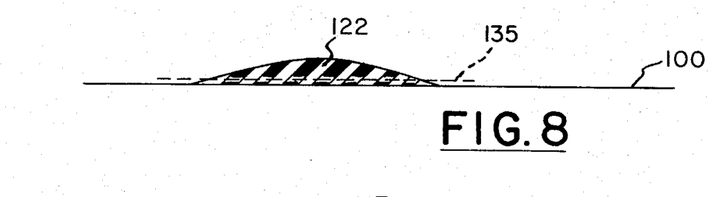
FIG. 8 is a diagrammatic sectional view taken along the line 8—8 in FIG. 6 showing the first die configuration in solid lines and the contour of the first preformer surface in dotted lines with relation to the roller surface.
Figure 9:
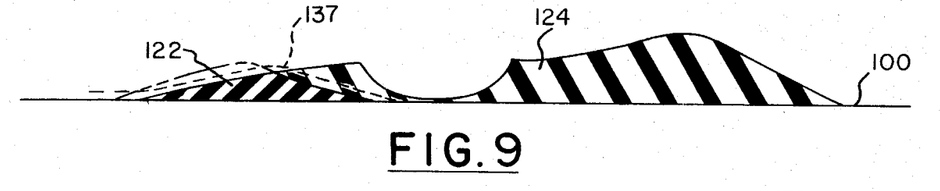
FIG. 9 is a view like FIG. 8 taken along the line 9—9 in FIG. 6 showing the second die configuration and the contour of the second preformer surface.
Figure 10:
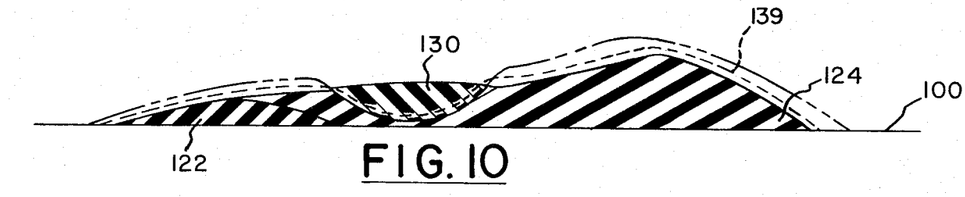
FIG. 10 is a view like FIG. 9 taken along the line 10—10 in FIG. 6 showing the third die configuration and the contour of the third preformer surface.

In FIGS. 8, 9 and 10, the cylindrical surface 100 is shown in relation to the contour of the extruded first strip 122, second strip 124 and third strip 130. Also shown in dotted lines is the contour of an opposing surface 135 of a first preformer 136, the contour of a guiding surface 137 of a guide means such as a second preformer 138 and the contour of a guiding surface 139 of a guide means such as a third preformer 140. The preformers 136, 138 and 140 may be preshaping bodies and are mounted on the first die head 102, second die head 106 and third die head 110, respectively. The preformer 136 is positioned upstream from the first orifice 114 with the opposing surface 135 being closely spaced from the cylindrical surface 100 of the roller 98 because there is no stock carried under the die head 102 by the roller. The surface 137 of the second preformer 138 may have a contour similar to the contour of the first orifice 114 in the first orifice plate 116 of the first die head 102 so that the first strip 122 can be carried on the roller 98 and guided under the preformer and into position for receiving the overlapping second strip 124 as shown in FIG. 9. In the same manner, the surface 139 of the third preformer 140 may have a contour similar to the contour of the second orifice 118 in the second orifice plate 120 on the second die head 106 so that the first and second strips 122 and 124 can be carried on the roller under the third preformer and into position for receiving the overlapping third strip 130 as shown in FIG. 10. There is substantially no backpressure at the orifice plates 116, 120 and 128 and therefore the stock can be carried by the roller 98 under the die heads 102, 106 and 110 for adding additional strips of different compounds to produce a formed band or co-extrusion such as the sidewall 94. At the same time split lines 142 are maintained between the strips 122, 124 and 130 in the sidewall 94.

Figure 12:
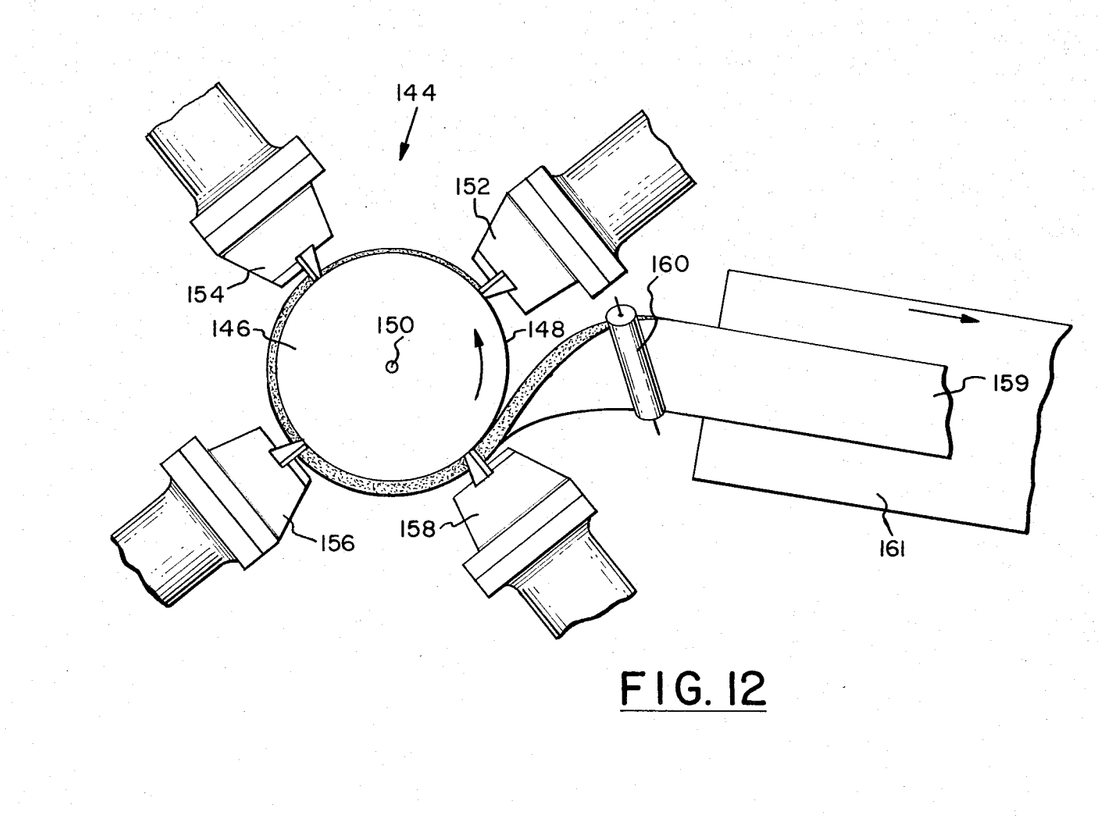
FIG. 12 is a fragmentary diagrammatic plan view of another modification in which the roller is rotatable about a vertical axis and the extruders are positioned radially of the roller. A horizontal take-away belt is also shown positioned between two of the extruders with the formed band guided from the vertical to horizontal position.

Referring to FIG. 12, a further modification is shown in which a multiple orifice roller die extrusion apparatus 144 has a roller 146 with a generally cylindrical roller surface 148 rotatable in a counterclockwise direction about a vertical axis 150. Die head means such as first die head 152, second die head 154, third die head 156 and fourth die head 158 are spaced circumferentially around the cylindrical roller surface 148 and are connected to pressure means such as extruders which extend radially outward from the roller 146. Each of the die heads 152, 154, 156 and 158 have preformers and orifice plates similar to those described and illustrated in the embodiment of FIGS. 6 through 11 for forming a band 159 from the strips extruded onto the roller 146. The band 159 is directed away from the roller 146 between the fourth die head 158 and first die head 152 by a support means such as guide roller 160 and the band 159 is carried away by horizontal belt means such as a take-away belt 161 extending in a generally radial direction away from the roller 146.

While certain representative embodiments and details have been shown for the purpose of illustrating the invention, it will be apparent to those skilled in the art that various changes and modifications may be made therein without departing from the spirit or scope of the invention.

What is claimed is:

1. A multiple orifice roller die extrusion apparatus for combining two or more extrudable strips of elastomeric materials into a formed co-extrusion, said apparatus having a roller with an axis circumvented by a roller surface and means for rotating said roller about said axis comprising die head means positioned adjacent to and having a generally cylindrical surface conforming to said roller surface, a first orifice and a second orifice in said die head means at spaced-apart positions, said first orifice being located for applying at least a first strip of elastomeric material over said roller surface, said second orifice being located for applying at least a second strip of elastomeric material over said roller surface at said spaced-apart positions to form a single co-extrusion of the two strips and guide means extending over said roller surface for at least part of the distance between said spaced-apart positions so that said first strip is maintained in a predetermined axial location.

2. The extrusion apparatus of claim 1 wherein said first orifice is positioned at one side of said cylindrical surface and at least a portion of said second orifice is spaced axially relative to said first orifice so that said first strip is overlapped by one edge of said second strip upon rotation of said roller.

3. The extrusion apparatus of claim 1 wherein a third orifice is positioned at the same angular position and on an opposite side of said cylindrical surface from said first orifice for applying a third strip of elastomeric material over said roller surface.

4. The extrusion apparatus of claim 1 wherein said die head means includes guide means for sliding engagement with said first strip and said second strip after application over said roller surface.

5. The extrusion apparatus of claim 1 wherein said second orifice is positioned relative to said first orifice for application of said second strip over said roller surface after application of said first strip over said roller surface.

6. The extrusion apparatus of claim 1 wherein said first orifice and said second orifice are located at positions spaced angularly relative to said axis of said roller.

7. The extrusion apparatus of claim 4 wherein said guide means includes a guiding member having a first configuration between said first orifice and said second orifice and a second configuration between said second orifice and an exit end of said guide means.

8. The extrusion apparatus of claim 5 wherein at least a portion of said second orifice is in the same axial position as a portion of said first orifice and recessed in said cylindrical surface to provide overlapping of said second strip with said first strip upon rotation of said roller.

9. The extrusion apparatus of claim 3 wherein said guide means includes a guiding member having a pair of axially spaced grooves between the angular position of said first and third orifices and the angular position of said second orifice, and said guiding member including a single groove between said second orifice and said exit end of said guide means.

10. The extrusion apparatus of claim 4 wherein said guide means has a recess extending from said first orifice to an exit end of said guide means, a replaceable guide insert fastened in said recess and having at least one guiding groove for maintaining said first strip in said first predetermined axial location and said second strip in a second predetermined axial location.

11. The extrusion apparatus of claim 10 wherein at least a part of said replaceable guide insert may be of a nonmetallic moldable material.

12. The extrusion apparatus of claim 1 comprising a first pressure means including a first extruder, a second pressure means including a second extruder spaced from said first extruder, said die head means comprising a die member connected to said first extruder and to said second extruder, a first die passageway in said die member between said first orifice and said first extruder and a second die passageway in said die member between said second orifice and said second extruder.

13. The extrusion apparatus of claim 12 wherein said first extruder has a screw rotatable about a first axis for extruding said first strip of elastomeric material, said second extruder has a screw rotatable about a second axis for extruding said second strip of material and said first extruder being positioned under said second extruder with said first axis of said first extruder screw at an angle to said second axis of said second extruder screw.

14. The extrusion apparatus of claim 8 wherein said die head means includes a first die head containing said first orifice, a second die head containing said second orifice spaced circumferentially downstream from said first die head, said guide means includes a guiding member extending upstream from said second orifice.

15. The extrusion apparatus of claim 14 wherein said guiding member has a guiding surface spaced from said cylindrical surface a distance at least equal to the distance said first orifice is spaced from said cylindrical surface so that said first strip may be carried by said roller under said second die head.

16. The extrusion apparatus of claim 14 wherein said first die head includes a first preformer positioned upstream from said first orifice, said second die head includes a second preformer positioned upstream from said second orifice, said second preformer having a guiding surface similar to the contour of said first orifice so that said first strip can be carried by said roller under said second die head.

17. The extrusion apparatus of claim 14 wherein said die head means includes a third die head spaced circumferentially downstream from said second die head and containing a third orifice, third pressure means for feeding a third strip of elastomeric material through said third orifice with at least a portion of said third orifice being in the same axial position as a portion of said first orifice or said second orifice so that a portion of said third strip is in overlapping relation with a portion of said first strip or a portion of said second strip, said third die including a third preformer positioned upstream from said third orifice, said third preformer having a guiding surface similar to the contour of said second orifice so that said first strip and said second strip can be carried by said roller under said third die head for addition of said third strip.

18. The extrusion apparatus of claim 17 wherein said third orifice is spaced from said cylindrical surface a distance at least equal to the distance said second orifice is spaced from said cylindrical surface so that said first strip and said second strip may be carried by said roller under said third die head.

19. The extrusion apparatus of claim 12 wherein said first pressure means includes a first extruder having a screw rotatable about an axis for extruding said first strip of material, said second pressure means includes a second extruder having a screw rotatable about an axis for extruding said second strip of material, said first die head being connected to said first extruder, said second die head being connected to said second extruder and said first extruder being positioned under said second extruder with said axis of said first extruder screw being at an angle to said axis of said second extruder screw.

20. The extrusion apparatus of claim 1 wherein said axis is generally vertical, including support means for directing said formed co-extrusion away from said roller surface and horizontal belt means for receiving said formed co-extrusion from said support means for carrying said co-extrusion to a location spaced radially from said roller.

21. The extrusion apparatus of claim 20 wherein said die head means includes a first die head and a second die head at predetermined positions spaced angularly relative to said axis connected to extruders which extend radially outward from said roller and said horizontal belt means extending in a generally radial direction away from said roller.

22. Extrusion apparatus for forming a co-extrusion by applying extruded strips of elastomeric material over a roller surface of a roller comprising means for guiding at least two strips applied at spaced-apart positions over said roller surface, said means for guiding including die head means positioned adjacent to and spaced from said roller surface and guide means in said die head means extending over said roller surface at least part of the distance between said spaced-apart positions to maintain said strips in predetermined axial locations relative to said roller.

23. The extrusion apparatus of claim 22 wherein said guide means includes grooves in said die head means enclosed by said roller surface.

24. A method of forming a co-extrusion formed of at least two component strips on at least one roller surface of a roller die comprising the steps of
    (a) applying a first extruded strip over said roller surface at a first position;
    (b) rotating said roller about an axis to accommodate said first extruded strip over said roller;
    (c) guiding said first extruded strip while it is carried by said roller at least part of the distance from said first position to a second position spaced apart from said first position;
    (d) applying a second extruded strip over said roller surface at said second position to form a single co-extrusion of said two component strips on said roller.

25. The method of claim 24 wherein at least a portion of said second strip is fed into the same position axially of said roller as said first strip so that said first strip is overlapped by at least an edge of said second strip.

26. The method of claim 24 wherein said first strip is fed through a first orifice at said first position and said second strip is fed through a second orifice at said second predetermined circumferential position.

27. The method of claim 26 wherein at least a portion of said second orifice is in the same axial position as a portion of said first orifice.

28. The method of claim 24 including applying a third extruded strip of elastomeric material over said roller at said first position at a third axial location spaced from said first position to form a third cross-sectional area of said co-extrusion, guiding a third strip from said first position to said second position and guiding said formed co-extrusion to maintain said third strip in said third axial location as said co-extrusion is carried by said roller to said third position.

29. The method of claim 24 wherein said first position is spaced apart angularly relative to said axis from said second position over said roller so that said first extruded strip is carried by said roller a first distance before said second extruded strip is applied over said roller.

30. The method of claim 29 including guiding said single co-extrusion after said second extruded strip is applied over said roller.

* * * * *

UNITED STATES PATENT AND TRADEMARK OFFICE
CERTIFICATE OF CORRECTION

PATENT NO. : 4,539,169

DATED : September 3, 1985

INVENTOR(S) : Bryan E. Nixon et al.

It is certified that error appears in the above-identified patent and that said Letters Patent is hereby corrected as shown below:

Column 10, line 10, delete "predetermined circumferential";
line 22, "roller to said third position" should read -- roller to a third position --.

Signed and Sealed this

Tenth Day of June 1986

[SEAL]

Attest:

DONALD J. QUIGG

Attesting Officer

Commissioner of Patents and Trademarks